United States Patent
Benbow

(10) Patent No.: US 7,313,311 B1
(45) Date of Patent: Dec. 25, 2007

(54) TELESCOPING ARM WITH MULTIPLE FIBER-OPTIC TERMINALS

(75) Inventor: LaKeisha Benbow, Alexandria, VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 11/366,565

(22) Filed: Mar. 3, 2006

(51) Int. Cl.
*G02B 6/36* (2006.01)
*G02B 6/00* (2006.01)

(52) U.S. Cl. .......................................... 385/134; 385/53
(58) Field of Classification Search ............... None
See application file for complete search history.

(56) References Cited

U.S. PATENT DOCUMENTS 6,963,690 B1 * 11/2005 Kassal et al.

OTHER PUBLICATIONS

The Technology; Verizon; Accessed Mar. 2006; pp. 1-2; Applicant makes no admission that this reference constitutes prior art. http://www22.verizon.com/about/community/fl/technology.html.

Architecture; Verizon; Accessed Mar. 2006; p. 1 of 1; Applicant makes no admission that this reference constitutes prior art. http://www22.verizon.com/about/community/fl/technology/fttp_arch..html.

FiOS Fact Sheet; Verizon; Accessed Mar. 2006; pp. 1-2; Applicant makes no admission that this reference constitutes prior art. http://www22.verizon.com/about/community/fl/technology/fios_ fact..html.

Paving The Light Transmission in Communication; PONet™ Fiber-To-The-Home-Solution; Hakko Opto; pp. 1-2; Hakko Opto Limited; Applicant makes no admission that this reference constitutes prior art.

* cited by examiner

*Primary Examiner*—Tina M. Wong

(57) ABSTRACT

An apparatus and method are provided for attaching a plurality of fiber-optic terminals to a telescoping arm so that the number of premises that may be served from a single location such as a handhole, manhole or vault may be increased without a substantial increase in equipment cost. A telescopic extension arm assembly is provided that has a telescopic arm with a first fiber-optic terminal affixed to one side of the telescopic arm and a second fiber-optic terminal affixed to a second side of the telescopic arm. Also provided is a mounting apparatus for attaching multiple fiber-optic terminals to the telescoping arm.

16 Claims, 5 Drawing Sheets

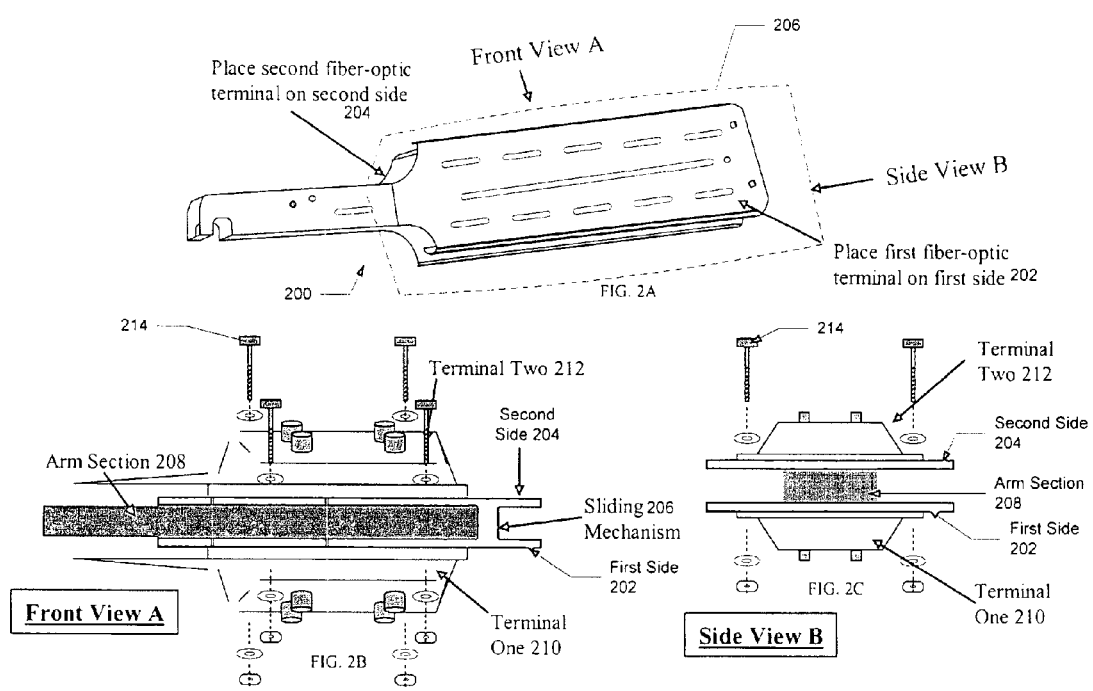

TELESCOPING ARM WITH MULTIPLE FIBER-OPTIC TERMINALS

BACKGROUND INFORMATION

Technological advancements such as the Internet, video on demand, high-definition television (HDTV), video conferencing, multiple telephone lines, etc. and the need or desire for better quality video and audio have created the demand for more and more bandwidth at businesses and homes. In response to this demand, telecommunications providers and others began installing fiber optic telecommunications cables with extremely large bandwidths to replace or supplement traditional copper and coaxial systems. Fiber-optic cable is known in the art to one of ordinary skill and is generally comprised of a plurality of fiber-optic strands and buffering material encased in one or more layers of shielding material. Initially, because of the cost of fiber optic cable, head-end equipment and terminating equipment, the fiber optic cable was extended only to large businesses and local exchange panels where service to small business, homes and other residential dwellings was still occurring through copper wires. However, bandwidth demand has continued to grow and costs of fiber-optic cable and equipments has decreased and consequentially, telecommunications providers and others have begun to install fiber optic cable all the way to small businesses, homes and other residential dwellings. This is generally referred to as fiber to the premises (FTTP).

Much of today's fiber-optic communications systems are either totally or partially installed underground. This is for protection of the cable, devices and other equipment that comprise the communications systems and also for aesthetic purposes. However, underground installation of fiber-optic communications systems requires that they compete for increasingly scarce underground space and easements that are already occupied by traditional utilities such as electricity, water, gas, sewer, copper telephone and CATV systems and also underground systems on the curtilage of dwellings including irrigation, landscape lighting and pet containment systems. Therefore, increasing the capacity of underground fiber-optic communications systems while minimizing the space and equipment needed as well as lowering costs will facilitate the expansion of FTTP.

BRIEF DESCRIPTION OF THE DRAWINGS

FIGS. 2A, 2B, 2C are illustrations of an embodiment of a telescopic arm according to a preferred embodiment of the present invention adapted for mounting two fiber-optic terminals on the single telescopic arm;

DETAILED DESCRIPTION OF PREFERRED EMBODIMENTS

The preferred embodiments implemented according to the present invention now will be described more fully with reference to the accompanying drawings, in which some, but not all possible embodiments of the invention are shown. Indeed, the invention (as recited by the claims appended hereto) may be embodied in many different forms and should not be construed as limited to the embodiments set forth herein. Rather, these embodiments are provided so that this disclosure will satisfy applicable legal requirements. Like numbers refer to like elements throughout.

Figure 1B:
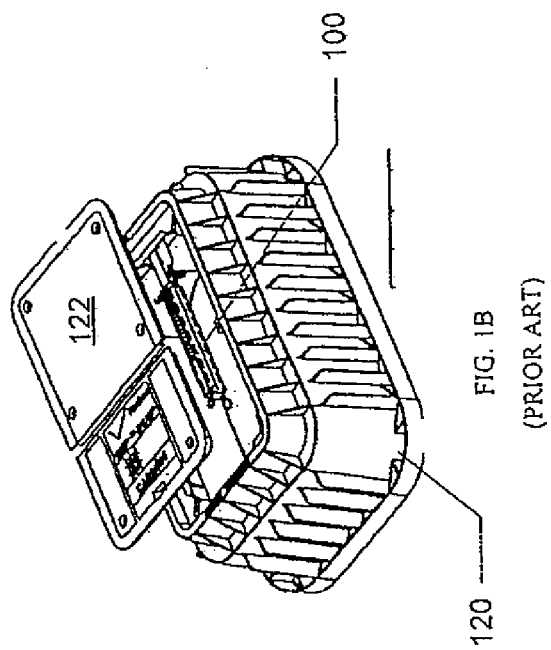
FIG. 1B is a exemplary prior art illustration of the telescoping arm of FIG. 1A installed in a prefabricated handhole for use in an underground installation of communications equipment.
Figure 1A:
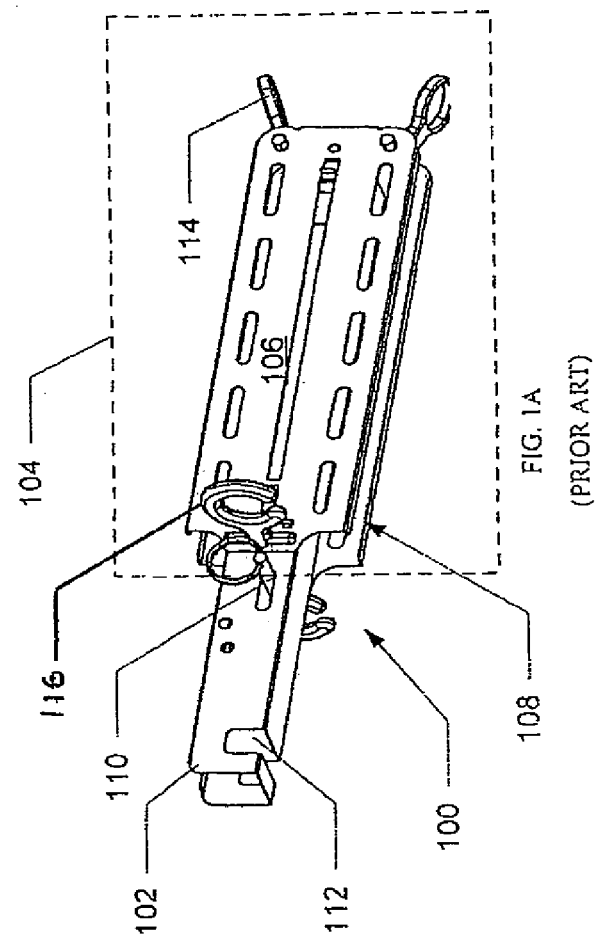
FIG. 1A is an exemplary prior art illustration of a telescoping arm that may be adapted in an embodiment according to the present invention such that it may be used to practice aspects of the preferred embodiment according to the present invention.

FIG. 1A is an exemplary prior art illustration of a telescoping arm 100 that may be adapted in an embodiment according to the present invention such that in may be used to practice aspects of the preferred embodiment according to the present invention. The telescoping arm 100 of FIG. 1A is generally comprised of an arm section 102 having a sliding section 104 comprised of a first side 106 and a second side 108, where the sliding section 104 may be extended and retracted along the arm section 102. The embodiment of FIG. 1A also has a locking/release mechanism 110 such that the sliding section 104 may be locked in place along the length of the arm section 102 and such that the sliding section 104 may be released to be extended or retracted to another position along the arm section 102. The arm section 102 of this embodiment is provided with a notch 112 so that the arm section 102 may be pivotally-engaged with the inside wall of a handhole, manhole, or other underground vault or vertical structure equipped with a suitable hinge device (not shown). The entire telescoping arm 100 may be pivoted at least in one direction about the hinge device by use of one or more lifting eyes 114 as shown on the sliding section 104. The embodiment of FIG. 1A is equipped with cable guides 116 such that a fiber-optic terminal (also known as a fiber distribution terminal or a fiber access terminal) mounted on either the first side 106 or the second side 108 of the sliding section 104 will have orderly arrangement and support of the cables entering and exiting the fiber-optic terminal and will help reduce any strain on such fiber-optic cables. The telescoping arm 100 is generally comprised of metal, fiberglass or plastic, though it may be comprised of other materials of suitable strength. It is to be appreciated that the telescoping arm 100 of FIG. 1A is designed for the installation of one fiber-optic terminal either on the first side 106 or the second side 108 of the sliding section 104. Such a telescoping arm as the one shown in FIG. 1A may be available from, for example, Carson Industries LLC of Glendora, Calif.

A fiber-optic terminal is a device where a distribution fiber-optic cable from a central office or a fiber distribution hub is routed through a fiber-optic drop cable to one or more premises. Generally, the fiber-optic drop cables are comprised of one strand of fiber optic material routed to a customer's premise, though it may have more strands in some instances. A four-port fiber-optic terminal, for instance, has one distribution cable entering it and may provide a fiber-optic drop cable to up to four different premises. Similarly, an eight-port fiber-optic terminal may provide fiber-optic drop cables to up to eight premises and a 12-port fiber-optic terminal may provide fiber-optic drop cables to up to 12 different premises. Generally, the fiber from a distribution fiber-optic cable is spliced to a fiber-optic drop cable at a fiber-optic terminal. Fiber-optic terminals are known in the art by one of ordinary skill.

The telescoping arm 100 of FIG. 1A facilitates the installation and maintenance of fiber-optic communication systems. FIG. 2B is an exemplary prior art illustration of the telescoping arm 100 of FIG. 1A installed in a prefabricated handhole 120 for use in an underground installation of communications equipment. As shown in FIG. 1A the telescoping arm 100 is attached to an inner wall of the handhole 120. Generally, this attachment is in the form of a hinge such that the telescoping arm 100 is pivotally engaged with the inner wall of the handhole 120. This pivotal engagement by the telescoping arm facilitates installation of the fiber-optic terminal and maintenance of the communications system. For instance, the lid 122 of the handhole 120 may be removed and the lifting eye 114 of the telescoping arm 100 may be used to lift the telescoping arm 100 and any fiber optic terminal attached thereto to a substantially vertical position. The sliding section 104 of the telescoping arm may then be extended thus facilitating access to the fiber-optic terminal, the access arm 100, the handhole 120 and any excess fiber-optic cable that may be coiled in the bottom of the handhole 120. This allows a technician to work on a terminal without lying on the ground in order to splice any fiber-optic strands. In maintenance, the access arm 100 prevents the terminal from being located at the bottom of the handhole where water may accumulate. The handhole 120 and lid 122 of FIG. 1B may be comprised of various materials including concretes, polymers, fiberglass, plastic, steel, etc. and is generally buried in the ground such that the lid 122 is substantially flush with grade level. Such a handhole as the one shown in FIG. 1B may be a 17"W× 30"L×24" deep prefabricated handhole as is available from, for example, Carson Industries LLC of Glendora, Calif.

FIGS. 2A, 2B, 2C are illustrations of an embodiment of a telescopic arm 200 adapted for mounting a plurality of fiber-optic terminals on the single telescopic arm 200. As shown on FIG. 2A, the telescoping arm 200 has at least a first side 202 and a second side 204. The first side 202 and the second side 204 are comprised of substantially rectangular plates and comprise at least a portion of the sliding section 206 that extends and retracts along the arm section 208. The telescoping arm 200 of FIG. 2A also shows the points of reference of the views that are shown in FIGS. 2B and 2C. It is to be appreciated that the telescoping arm 200 of FIG. 2A does not show the installation of any fiber-optic terminals.

FIG. 2B is a front view of the telescoping arm 200 of FIG. 2A with the addition of two fiber-optic terminals, terminal one 210 and terminal two 212. This is similar to a view that a technician would see upon opening the lid of a handhole and looking down into the handhole. As shown in FIG. 2B, terminal one 210 is affixed to the first side 202 of the sliding section 206 of the telescoping arm 200 and terminal two 212 is affixed to the second side 204 of the sliding section 206 of the telescoping arm 200. Terminal one 210 and terminal two 212 are shown as four-port fiber-optic terminals, as are known in the art by one of ordinary skill. It is to be appreciated, however, that terminal one 210 and terminal two 212 may have port configurations other than four-ports and that the fiber-optic terminals 210, 212 are not required to have the same number of ports. For instance, it is contemplated that terminal one 210 may be a four port fiber-optic terminal while terminal two 212 may be an eight-port fiber-optic terminal. Similarly, terminal one 210 may be an eight-port fiber-optic terminal while terminal two 212 may be a 12-port fiber-optic terminal. Furthermore, it is contemplated that more than one fiber-optic terminal may be affixed to each side 202, 204 of the telescoping arm 200. For instance, two four-port fiber optic terminals may be affixed to the first side 202 and an eight-port fiber-optic terminal affixed to the second side 204 of the telescoping arm 200.

The fiber optic terminals terminal one 210 and terminal two 212 are affixed to the first side 202 and the second side 204 by the use of connectors. In FIG. 2B, these connectors 214 are shown as four threaded bolts with respective washers and nuts, where the bolts pass through terminal one 210, the first side 202, the second side 204 and terminal two 212. It is to be appreciated, however, that different forms and arrangements of connectors 214 may be used. For example, the connectors 214 may be clips, clamps, staples, etc and varying numbers or arrangements may be used. For instance, there may only be two connectors 214 rather than the four as shown in FIG. 2B. Furthermore, it is to be appreciated that other forms of affixation may be used to affix the fiber-optic terminals to the first side 202 and the second side 204 such as, for example, adhesives including glues and tapes, and magnetics.

FIG. 2C is a side view of the telescoping arm 200 of FIG. 2A including the fiber-optic terminals, terminal one 210 and terminal two 212, and the connectors 214 that affix the fiber-optic terminals 210, 212 to the first side 210 and the second side 212, respectively.

Figure 3:
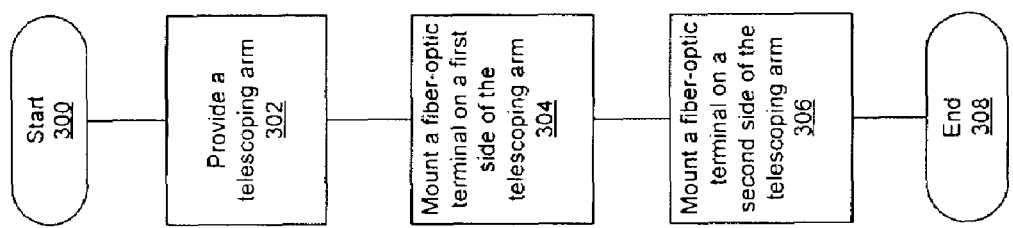
FIG. 3 is a flowchart for an exemplary process of providing fiber-optic terminal ports in a restricted amount of space such as, for example, a handhole, in a preferred embodiment according to the present invention.

FIG. 3 is an exemplary process of providing fiber-optic terminal ports in a restricted amount of space such as, for example, a handhole. The process starts at step 300. At step 302, a telescopic arm is provided that has at least a first side and a second side for the mounting of fiber-optic terminal equipment. At step 304, a first fiber-optic terminal is mounted on the first side of the telescoping arm. At step 306, a second fiber-optic terminal is mounted on the second side of the telescoping arm. The process ends at step 308. In the process described in FIG. 3, the fiber-optic terminals may be of the same or different number of ports, as described above. For instance, the fiber-optic terminals may each be four-port fiber optic terminals. It is to be appreciated that the process of mounting fiber-optic terminals on at least two sides of a telescoping arm effectively doubles the number of premises that may be served with drop cables from the same handhole, manhole or vault while only incrementally increasing the equipment cost (for the second fiber-optic terminal).

Figure 4:
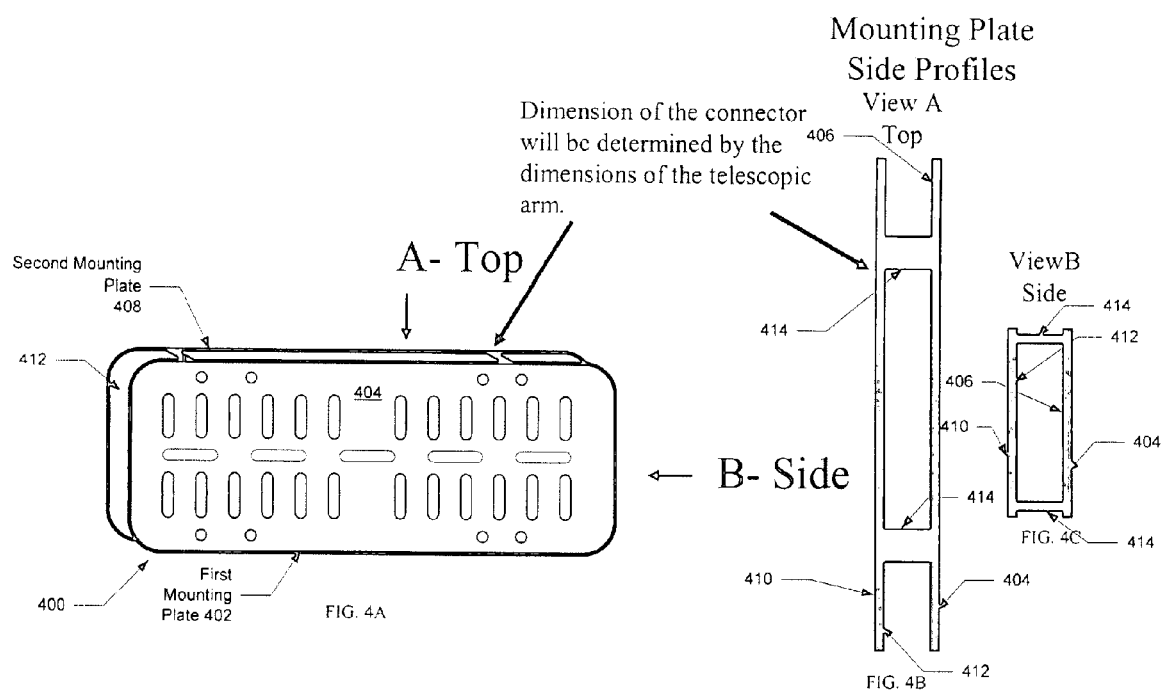
FIGS. 4A, 4B and 4C are illustrations of an embodiment of a mounting device according to the present invention that may be mounted on a telescopic arm and have two or more fiber-optic terminals attached to the mounting device.

FIGS. 4A, 4B and 4C are illustrations of a preferred embodiment of a mounting apparatus that may be mounted on a telescopic arm and have two or more fiber-optic terminals attached to the mounting apparatus. In FIG. 4A, the mounting apparatus 400 is comprised of a first mounting plate 402 having at least two sides, a first outside 404 and a first inside (not shown FIG. 4A, see FIGS. 4B and 4C) 406; and a second mounting plate 408 also having at least two sides, a second outside (not shown FIG. 4A, see FIGS. 4B and 4C) 410 and a second inside 412. The mounting apparatus is further comprised of one or more connectors 414 in substantial contact with both the first mounting plate 402 and the second mounting plate 408. The one or more connectors 414 are configured to apply force on one or both of the first mounting plate 402 and the second mounting plate 408 such that said first inside 406 of the first mounting plate 402 and the second inside 410 of the second mounting plate 408 are brought closer together. The mounting apparatus 400 may be pre-assembled and have a fiber-optic terminal affixed to the first outside 404 of the first mounting plate 402 and the second outside 412 of the second mounting plate 408. The fiber-optic terminals may be affixed as described above in relation to FIGS. 2A-2C. The mounting apparatus 400 may then be slipped or otherwise placed over the first side 202 and the second side 204 of the sliding section 206 of the telescoping arm 200. Once placed over the sliding section 206 of the telescoping arm 200, the connectors 414 are tightened or otherwise compressed such that compression and friction affix the mounting apparatus 400 to the sliding section 206 of the telescoping arm 200. It is to be appreciated that other means of affixing the mounting apparatus to the sliding section 206 of the telescoping arm are contemplated, including connectors that attach each mounting plate 402, 408 directly to a respective side 202, 204 of the sliding section, adhesives, magnetics, etc.

While the mounting apparatus of FIGS. 4A-4C is shown as substantially rectangular in shape, other shapes are contemplated. In one embodiment, the mounting plates 402, 408 are universal mounting plates as are available from Carson Industries LLC as part number 80001006, though other mounting plates are also contemplated. The use of the mounting apparatus 400 provides for pre-assembly of the mounting apparatus and fiber-optic terminals, which facilitates installation or replacement in the field, particularly in areas of limited space such as a handhole, manhole, vault, etc.

Figure 5:
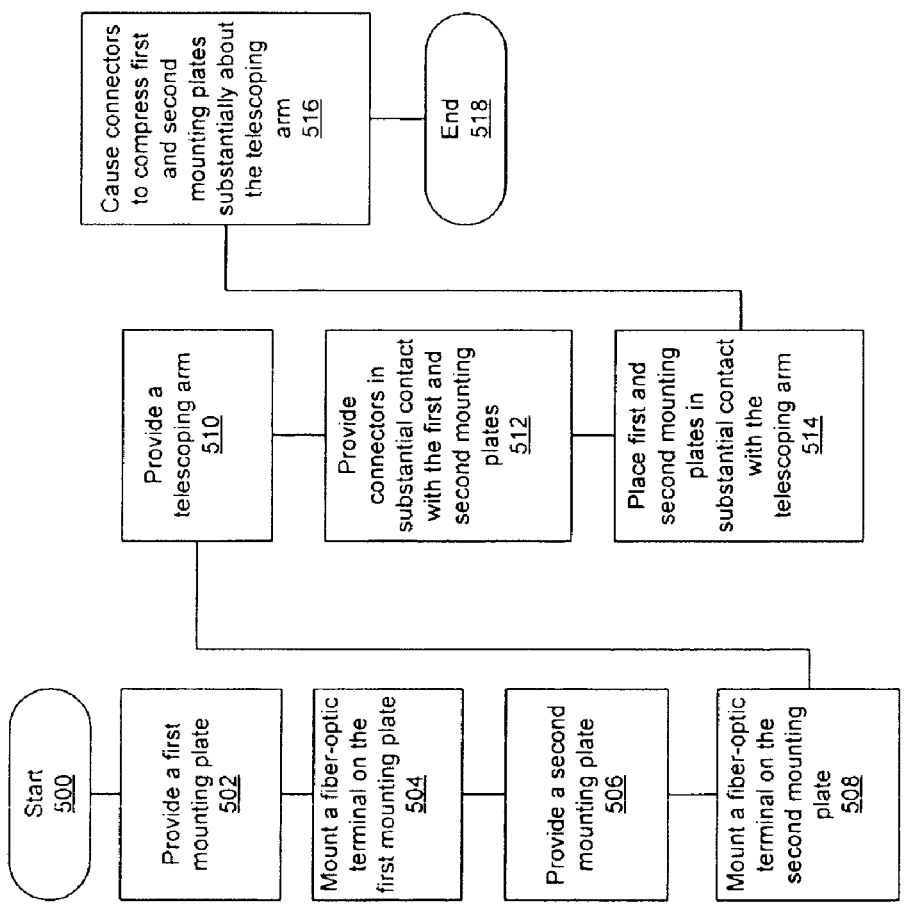
FIG. 5 is a flowchart for an exemplary process of attaching fiber-optic terminals to a telescopic arm in a preferred embodiment according to the present invention.

FIG. 5 is a flowchart for an exemplary process of attaching fiber-optic terminals to a telescopic arm. The process starts at step 500. At step 502, a first mounting plate is provided that has at least two sides, a first outside and a first inside. At step 504, a first fiber-optic terminal is mounted on the first outside of the first mounting plate. At step 506, a second mounting plate is provided that has at least two sides, a second outside and a second inside. At step 508, a second fiber-optic terminal is mounted on the second outside of the second mounting plate. At step 510, a telescopic arm is provided that has at least a first side and a second side. At step 512, one or more connectors are provided where each connector is in substantial contact with both the first mounting plate and the second mounting plate. At step 514, the first side and the second side of the telescopic arm are placed in substantial contact with the first inside of the first mounting plate and the second inside of the second mounting plate. Then, at step 516, the one or more connectors cause the first mounting plate and the second plate to apply compression force to the telescopic arm and the first mounting plate and the second mounting plate are affixed to the telescopic arm by the compression force and friction. The process of FIG. 5 ends at step 518. In the process described in FIG. 5, the fiber-optic terminals may be of the same or different number of ports, as described above.

Many modifications and other embodiments will come to mind to one skilled in the art having the benefit of the teachings presented in the foregoing descriptions of the preferred embodiments. For instance, the embodiments according to the present invention are equally adaptable to an extension arm that does not necessarily telescope (i.e., extend and retract) and such an extension arm is contemplated within the definition of a telescoping arm. Likewise, while the figures generally show two fiber-optic terminals attached to the telescoping arm, it is contemplated that any plurality of fiber-optic terminals may be attached to the telescoping arm either directly or through the use of a mounting apparatus. Accordingly, it should be understood that the invention is not to be limited to the specific embodiments described herein, but rather to the appended claims, and that modifications and other embodiments are intended to be included within the scope of the appended claims. Although specific terms are employed herein, they are used in an inclusively descriptive sense only and not for purposes of limitation.

That which is claimed:

1. A fiber-optic terminal adapter assembly configured to slide over a telescoping arm assembly comprising an arm section and a sliding section, said sliding section comprising a first outside side plate and a second outside side plate, wherein said first outside side plate and said second outside side plate are substantially parallel to each other and separated by a fixed distance, said fiber-optic terminal adapter comprised of:
   a first mounting plate having an outside first face and an inside first face, said first mounting plate having a first plurality of openings adapted to receive fasteners, said plurality of openings spaced to accommodate fasteners associated with a multiple port fiber-optic terminal, said first mounting plate having a rectangular shape wherein an area of the outside first face is greater than an area of the first outside of the sliding section of the telescoping arm assembly;
   a second mounting plate having an outside second face and an inside second face, said second mounting plate having a second plurality of openings wherein the second plurality of openings are configured the same as the first plurality of openings, said second plurality of openings spaced to accommodate said fasteners associated with a second multiple port fiber-optic terminal, said second mounting plate having a size the same as the first mounting plate; and
   a plurality of connectors joining the first mounting plate to the second mounting plate such that the first mounting plate is substantially parallel to the second mounting plate, each of the plurality of connectors emanating from an edge of the first mounting plate to a respective edge of the second mounting plate, wherein the plurality of connectors are sized and positioned to allow the adapter assembly to slide over the sliding section of the telescoping arm assembly such that the inside first face and the inside second face both contact the first outside side plate and the second outside side plate respectively.

2. The fiber optic terminal assembly of claim 1 further comprising:
   a plurality of fasteners extending through 1) a respective one of the first plurality of openings of the first mounting plate, 2) a first opening of the first outside side plate of the sliding section, 3) a second opening of the second outside side plate of the sliding section, and 4) a respective one of the second plurality of openings of the second plate, said fastener capable of exerting a force on the outside first face and the outside second face, whereby the plurality of fasteners affix the fiber optic terminal adapter to the telescoping arm assembly.

3. The fiber optic terminal adapter of claim 1 further comprising:
   a first multiple port optical-fiber terminal adapter comprising a plurality of mounting holes, said first multiple port optical-fiber terminal adapter in contact with said first outside face of said first mounting plate and attached with a first subset of said plurality of fasteners; and
   a second multiple port optical-fiber terminal adapter comprising a second plurality of mounting holes, said second multiple port optical-fiber terminal adapter in contact with said second outside face of said second mounting plate and attached with a second subset of said plurality of fasteners.

4. The fiber optic terminal adapter of claim 3 wherein the first multiple port optical-fiber terminal adapter is a four port optical-fiber terminal.

5. The fiber optic terminal adapter of claim 3 wherein the second multiple port terminal adapter is an eight port optical-fiber terminal.

6. The fiber optic terminal adapter of claim 2 further comprising: a handhole pivotly engaging said telescoping arm affixed to said fiber optic terminal assembly.

7. The fiber-optic terminal assembly of claim 1, wherein said one or more connectors comprise bolts.

8. The fiber-optic terminal assembly of claim 1, wherein said fasteners comprise bolts.

9. A fiber optic terminal assembly comprising:
a) a telescoping arm assembly comprising 1) an arm configured to pivotly engage with a handhole and 2) a sliding section, wherein said sliding section comprises a first sliding plate and a second sliding plate, both plates having a plurality of openings wherein said first and said second sliding plates are substantially parallel to each other and spaced apart, wherein further the first sliding plate and second sliding plate are of a certain surface area, said sliding section configured to slide over said arm;
b) a fiber-optic terminal adapter comprised of:
a first mounting plate having an outside first face and an inside first face, said first mounting plate having a first plurality of openings adapted to receive fasteners, said plurality of openings spaced to accommodate fasteners associated with a multi-port fiber optic terminal, said first mounting plate having a rectangular shape wherein the area of the outside first face is greater than the area of the first sliding plate of the sliding section of the telescoping arm assembly;
a second mounting plate having an outside second face and an inside second face, said second mounting plate having a second plurality of openings adapted to receive said fasteners, said second plurality of openings spaced to accommodate said fasters associated with a second multi-port fiber optic terminal, said second mounting plate having the same size as the first mounting plate;
a plurality of connectors joining the first mounting plate to the second mounting plate such that the first mounting plate is substantially parallel to the second mounting plate, each of the plurality of connectors emanating from an edge of the first mounting plate to a respective edge of the second mounting plate, wherein the plurality of connectors are sized and positioned to allow the adapter assembly to slide over the sliding section of the telescoping arm assembly such that the inside first face and the inside second face both contact the first outside sliding plate and the second sliding side plate respectively;
c) a plurality of fasteners extending through 1) a respective one of the first plurality of openings of the first mounting plate, 2) through one of the plurality of openings in the first sliding plate, 3) through one of the plurality of openings in the second sliding plate, and 4) through one of the second plurality of openings of the second mounting plate, said fastener capable of exerting a force on the outside first face and the outside second face so as to draw them together, whereby the telescoping extension adapter is attached to said fiber optic terminal adapter using said plurality of fasteners; and
d) a first multiple port optical fiber terminal fastened to the first mounting plate and a second multiple port optical fiber terminal fastened to the second mounting plate, using at least a subset of the plurality of fasteners.

10. A method of providing fiber-optical terminal ports in a confined space, said method comprising:
a) providing a telescopic arm having a slidable section comprising a first rectangular outside sliding plate with a plurality of holes and a second rectangular outside sliding plate, wherein the second rectangular sliding plate has the same shape and hole configuration as the first rectangular sliding plate, wherein further the first rectangular sliding plate is substantially parallel to the second rectangular sliding plate;
b) sliding a fiber-optical terminal adapter over the slidable section, wherein the fiber-optical terminal adapter comprises:
a first mounting plate having an outside first face and an inside first face, said first mounting plate having a first plurality of openings adapted to receive fasteners, said plurality of openings spaced to accommodate fasteners associated with a multiple port fiber-optical terminal, said first mounting plate having a rectangular shape wherein the area of the outside first face is greater than the area of the first rectangular outside sliding plate of the sliding section of the telescoping arm assembly;
a second mounting plate having an outside second face and an inside second face, said second mounting plate having a second plurality of openings adapted to receive said fasteners, said second plurality of openings spaced to accommodate said fasters associated with a second multiple port fiber-optical terminal, said second mounting plate having the same size as the first mounting plate; and
c) mounting a first multiple port fiber-optical terminal to said first mounting plate and a second multiple port fiber-optical terminal to said second mounting plate by using a plurality of fasteners wherein each respective fastener extends through 1) a respective hole in the first multiple port fiber-optical terminal, 2) a respective hole in said first mounting plate, 3) a respective hole in said first sliding plate, 4) a respective hole in said second sliding plate, 5) a respective hole in said second mounting plate, and 6) a respective hole in said second multiple port fiber-optical terminal.

11. The method of claim 10, further comprising the step of inserting the telescopic arm into a handhole.

12. The method of claim 10, wherein mounting a second multiple port fiber-optical terminal on said second mounting plate comprises mounting a four-port terminal on said second mounting plate.

13. The method of claim 10, wherein mounting a first terminal on said first mounting plate and mounting a second terminal on said second mounting plate comprises mounting a four-port fiber-optical terminal on said first mounting plate and mounting a four-port fiber-optical terminal on said second mounting plate.

14. The method of claim 10, further comprising the step of:
pivotally engaging said telescopic arm at least at one point with an inside wall of a handhole for the installation of a substantially underground fiber-optic communications system.

15. The method of claim 14, wherein pivotally engaging said telescopic arm at least at one point with an inside wall of a handhole comprises pivotally engaging said telescopic arm at least at one point on the inside wall of a handhole that is rectangular in shape and has dimensions of approximately 17 inches wide by 30 inches long by 24 inches deep.

16. The method of claim 10, wherein said fasteners that extend through 1) a respective hole in the first multiple port fiber-optical terminal, 2) a respective hole in said first mounting plate, 3) a respective hole in said first sliding plate, 4) a respective hole in said second sliding plate, 5) a respective hole in said second mounting plate, and 6) a respective hole in said second multiple port fiber-optical terminal are bolts.

\* \* \* \* \*